United States Patent
Ito et al.

(10) Patent No.: US 6,771,449 B1
(45) Date of Patent: Aug. 3, 2004

(54) FALLING SENSOR AND THE INFORMATION PROCESSING DEVICE MAKING USE OF IT

(75) Inventors: Tatsuya Ito, Odawara (JP); Tadashi Okumura, Fujisawa (JP); Tsuyoshi Takahashi, Odawara (JP); Masatoshi Ishikawa, Odawara (JP); Yuji Nishimura, Odawara (JP); Tetsuo Yuki, Hiratsuka (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 483 days.

(21) Appl. No.: 09/694,372

(22) Filed: Oct. 24, 2000

(30) Foreign Application Priority Data

Jun. 23, 2000 (JP) ..................................... P2000-194891

(51) Int. Cl.[7] .............................. G11B 21/02; G01L 9/00
(52) U.S. Cl. ........................... 360/75; 360/69; 360/105; 73/489
(58) Field of Search ........................... 360/75, 69, 105, 360/106; 73/489, 1.38, 494, 496

(56) References Cited

U.S. PATENT DOCUMENTS

| | | | | |
|---|---|---|---|---|
| 2,552,722 A | * | 5/1951 | King ........................ | 73/514.12 |
| 4,284,983 A | * | 8/1981 | Lent ........................... | 340/522 |
| 4,825,697 A | * | 5/1989 | Huber ...................... | 73/514.14 |
| 5,027,657 A | * | 7/1991 | Juckenack et al. ........ | 73/514.13 |
| 5,101,669 A | * | 4/1992 | Holm-Kennedy et al. .................... | 73/862.626 |
| 5,452,612 A | * | 9/1995 | Smith et al. .............. | 73/514.34 |
| 5,982,573 A |   | 11/1999 | Henze | |
| 6,005,205 A | * | 12/1999 | Chou ................... | 200/61.45 M |
| 6,046,877 A | * | 4/2000 | Kelsic ......................... | 360/75 |
| 6,069,560 A | * | 5/2000 | Larsson ...................... | 340/540 |
| 6,249,274 B1 | * | 6/2001 | Svancarek et al. .......... | 345/158 |
| 6,311,557 B1 | * | 11/2001 | Davis et al. ............. | 73/514.31 |
| 6,520,013 B1 | * | 2/2003 | Wehrenberg ................. | 73/489 |

FOREIGN PATENT DOCUMENTS

JP 7201124 8/1995

* cited by examiner

*Primary Examiner*—David Hudspeth
*Assistant Examiner*—Jason Olson
(74) *Attorney, Agent, or Firm*—Kenyon & Kenyon

(57) ABSTRACT

A falling sensor is provided, which detects a falling of a magnetic disk drive or a information processing device installed with the magnetic disk drive and which is effective for avoiding physical damage of magnetic heads and magnetic disk media. The magnetic disk drive or the information processing device, include an unload mechanism moving or evacuating the magnetic head from a surface of the magnetic disk media, and a falling sensor comprising a conductive flexible beam or member having a compatible function, a conductive weight supported by these beams and a conductive wall arranged to be made in contact or non-contact with the weight. The sensor can detect a falling of the magnetic disk drive or the information processing device, which is typically a notebook personal computer installed with the magnetic disk drive, and evacuate the magnetic head by the unload mechanism. The conductive wall can be formed of a tubular member.

20 Claims, 7 Drawing Sheets

FALLING SENSOR AND THE INFORMATION PROCESSING DEVICE MAKING USE OF IT

FIELD OF THE INVENTION

The present invention relates to a falling sensor, which detects a falling state of a subject and the information processing device which uses the falling sensor, especially to the technology of preparing operation for a shock at the end of the falling and enhancing a shock resistance by such preparation for the shock.

BACKGROUND OF THE INVENTION

A magnetic disk drive is known as an information processing device, during a falling, which can perform an operation for receiving a shock at the end of the falling and which can improve a shock resistance.

In conventional arts, there is a magnetic disk drive provided with a protection function, which can protect itself from data loss or off tracks by detecting a vibration and so on with an accelerometer, by interrupting writing operation before data are written at an off-track position. However, this protection function is not so effective as to alleviate a collision shock that derives from a free falling of the magnetic disk drive.

An acceleration of the free falling is only one gravity. One gravity is not enough for such prior sensor to activate the protection function that the prior sensor can start to act with two to ten times of gravity. And if the protection function would not start, magnetic heads be still on magnetic disks, which would cause severe physical damage on the magnetic disks. Therefore, in the present technique when magnetic disk drives are given with shocks while magnetic heads are positioned on the magnetic disks, damage tolerance depends simply on a strength of the magnetic heads and the magnetic disks.

While there are magnetic disk drives having accelerometer devices to detect falling state, there are other magnetic disk drives having a simple-structure sensor without complicated electronic circuits. As an example of such simple structure, JP-A-8-29450 discloses a magnetic disk drive, which is provided with a status sensor having a conductive sphere that is sealed within a cavity in order to detect whether the magnetic disk drive is in unstable state, and before shocks attack the drive which can prepare a countermeasure operation preventing erroneous operation.

In a conventional art, a shock-detecting sensor is activated immediately after the shock is incurred at the end of the falling of a magnetic disk drive. Instantaneous shock-avoiding operation of such drive as an interruption of read/write operation with data to magnetic disk media can minimize damages to some extent.

Regarding to the physical damage by the clash of magnetic heads and so on to a surface of the magnetic disk media, which is caused by a vertical shock to the surface of the magnetic disks, the activation of the sensor incurred after the shock cannot avoid such vertical damage because there is not enough time for the magnetic heads to move from a position on the media to an outside position of the media. Therefore, the prevention of the damage depended on the strength of the magnetic heads and the magnetic disks.

The method of detecting the falling by an acceleration sensor device requires an expensive high-sensitivity analog output sensor. This kind of a sensor is so vulnerable to the erroneous operation with noise that a vector arithmetic processing is inevitable. And it needs complicated electric circuits for the erroneous operation and additional amplifying circuits.

The JP-A-8-29450 discloses a status sensor having a sphere sealed within a cavity. At a free-falllng state with zero initial speed, the sphere is adhered to a wall surface of the cavity, therefore the falling state cannot be detected. As the sphere can travel inside the cavity freely, the falling state cannot be accurately detected.

The present invention objects to offer a simple-structure sensor which can sense falling including a free falling using a simple method. The present invention also offers to improve a shock tolerance of a magnetic disk drive or an information processing device by mounting the sensor on them. The present invention also offers an information processing device having this sensor, which performs during a falling anti-shock operation for the end of the falling, for example, a magnetic disk drive moving or evacuating magnetic heads from surface of magnetic disk media, or another information processing device having such magnetic disk drive. They have high shock tolerance because of enabling magnetic heads to evacuate from the surface of the magnetic disk media, while the magnetic disk drive or the information processing device goes into falling state before the end of the falling.

SUMMARY OF THE INVENTION

The present invention shows to achieve above described objects, as the information processing device which performs during the falling a shock-resistant operation for the shock occurred at the end of the falling, a magnetic disk drive or a information processing device built in with the magnetic disk drive. The magnetic disk drive is provided with a mechanism which can evacuate magnetic heads performing read or write operation to magnetic disk, from the surface of the magnetic disk and have a falling detecting sensor (hereafter called a falling sensor). The falling sensor is provided with a conductive weight, a flexible elastic member which can be deflected by the conductive weight with gravity, and a conductive member arranged to contact or not to contact freely with the conductive weight that contacts with the conductive member when the flexible elastic member is deflected.

The falling sensor may be built into the magnetic disk drive which is built into the information processing device, or may be built into the information processing device together with the magnetic disk drive. The information processing device may be these, a mobile PC, a notebook computer, portable terminals, etc.

When the magnetic disk drive falls, to which the present invention is applied, the falling sensor goes into no-gravity state and detects the falling because the gravity working to the weight is reduced to zero by the falling, and because the weight apart from the conductive member. On detecting the falling, the drive activates an evacuating operation that an evacuating structure evacuates the magnetic heads from the surface of the magnetic disk media.

As for the falling sensor arranged to the magnetic disk drive or to the information processing device built in with the magnetic disk drive, to make the conductive member into cylindrical, to which the weight can contact to an inner side of the cylindrical conductive member, brings freedom in a direction for sensing the falling.

As for the falling sensor arranged to the magnetic disk drive or to the information processing device built in with the magnetic disk drive, if one of the conductive member and the conductive weight is made with magnet and the other is made with ferromagnetic material, the contacting state can be more stabilized.

If a pair of the falling sensors arranged to the magnetic disk drive or the information processing, and if the elastic members of the falling sensors attached respectively to the directions crossing each other on a same plane, a falling can be detected more reliably regardless of declinations of the magnetic disk drive.

DESCRIPTION OF THE PREFERRED EMBODIMENTS

Figure 1:
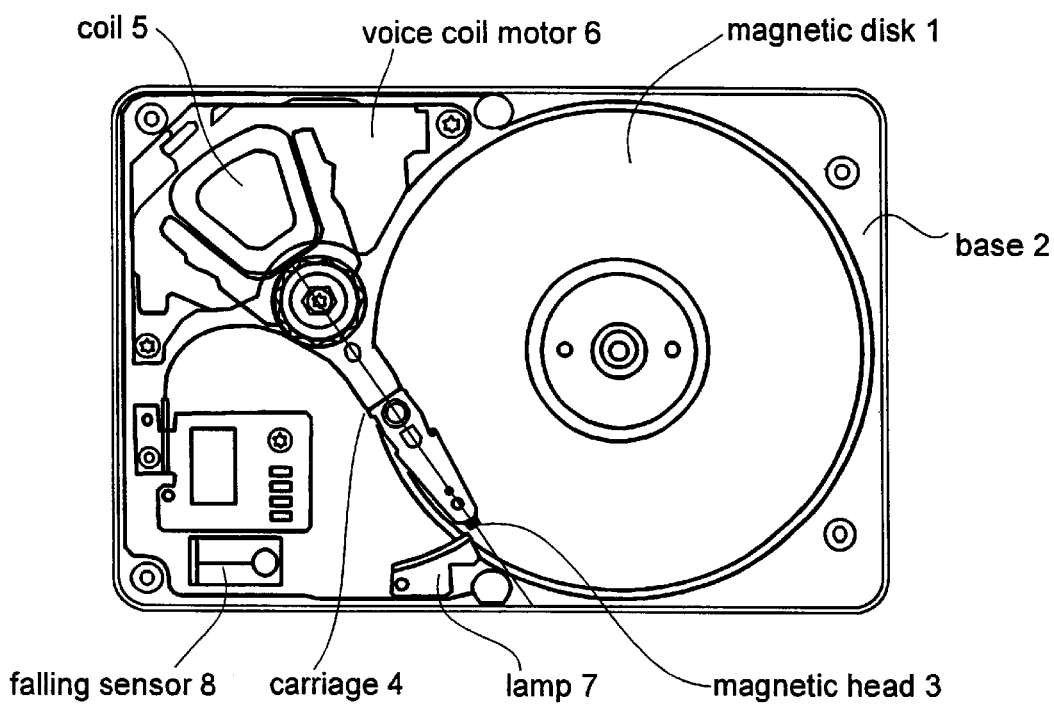
FIG. 1 is a drawing illustrating the outline of the magnetic disk drive of the preferred embodiment of the present invention.
Figure 4:
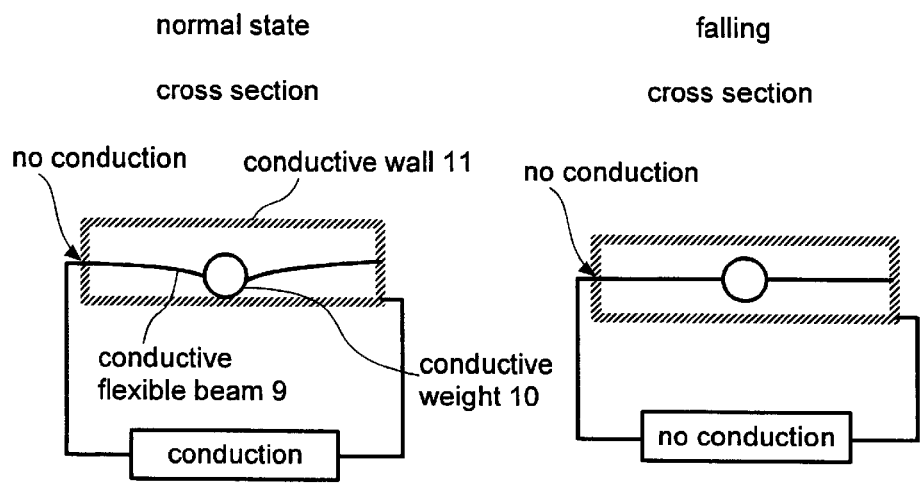
FIG. 4 is a drawing illustrating a third example of the structure of the falling sensor using two beams.
Figure 5:
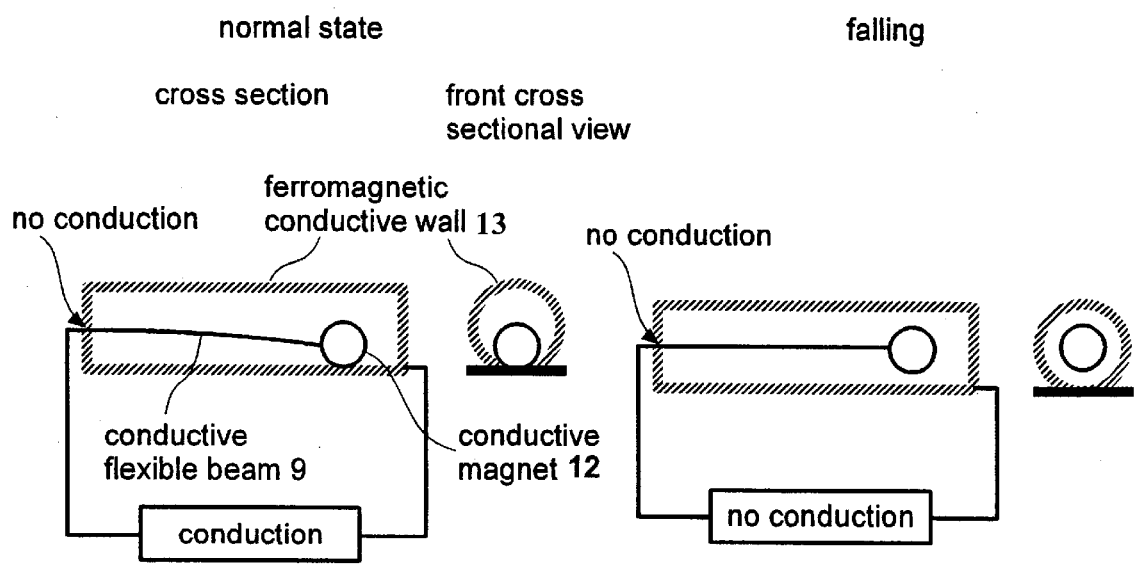
FIG. 5 is a drawing illustrating a fourth example of the structure of the falling sensor using magnetism.
Figure 6:
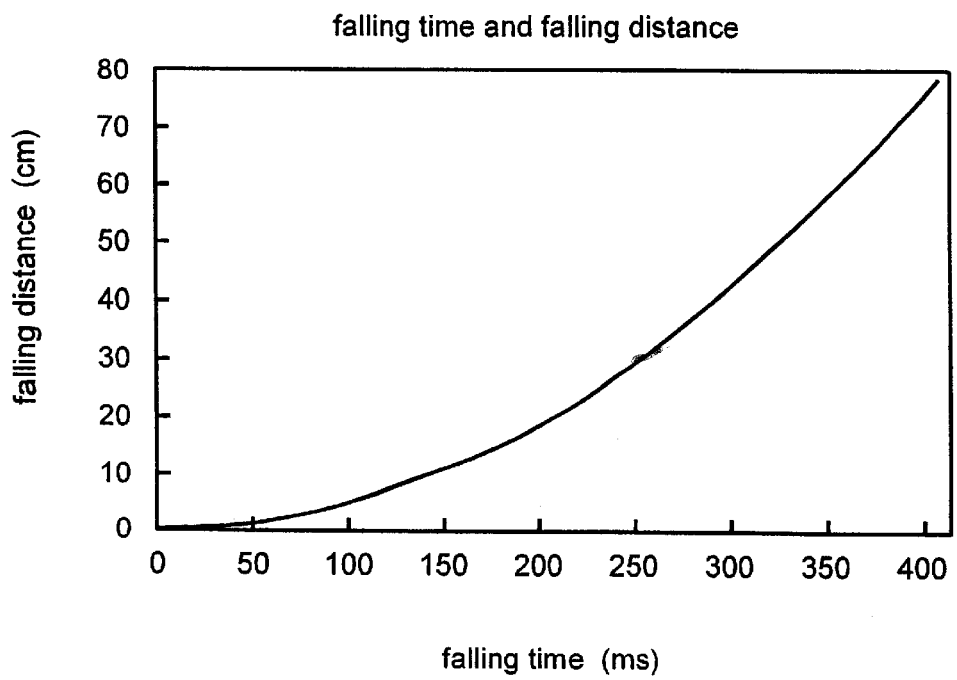
FIG. 6 is a drawing illustrating the relations between falling time and falling distance.
Figure 7:
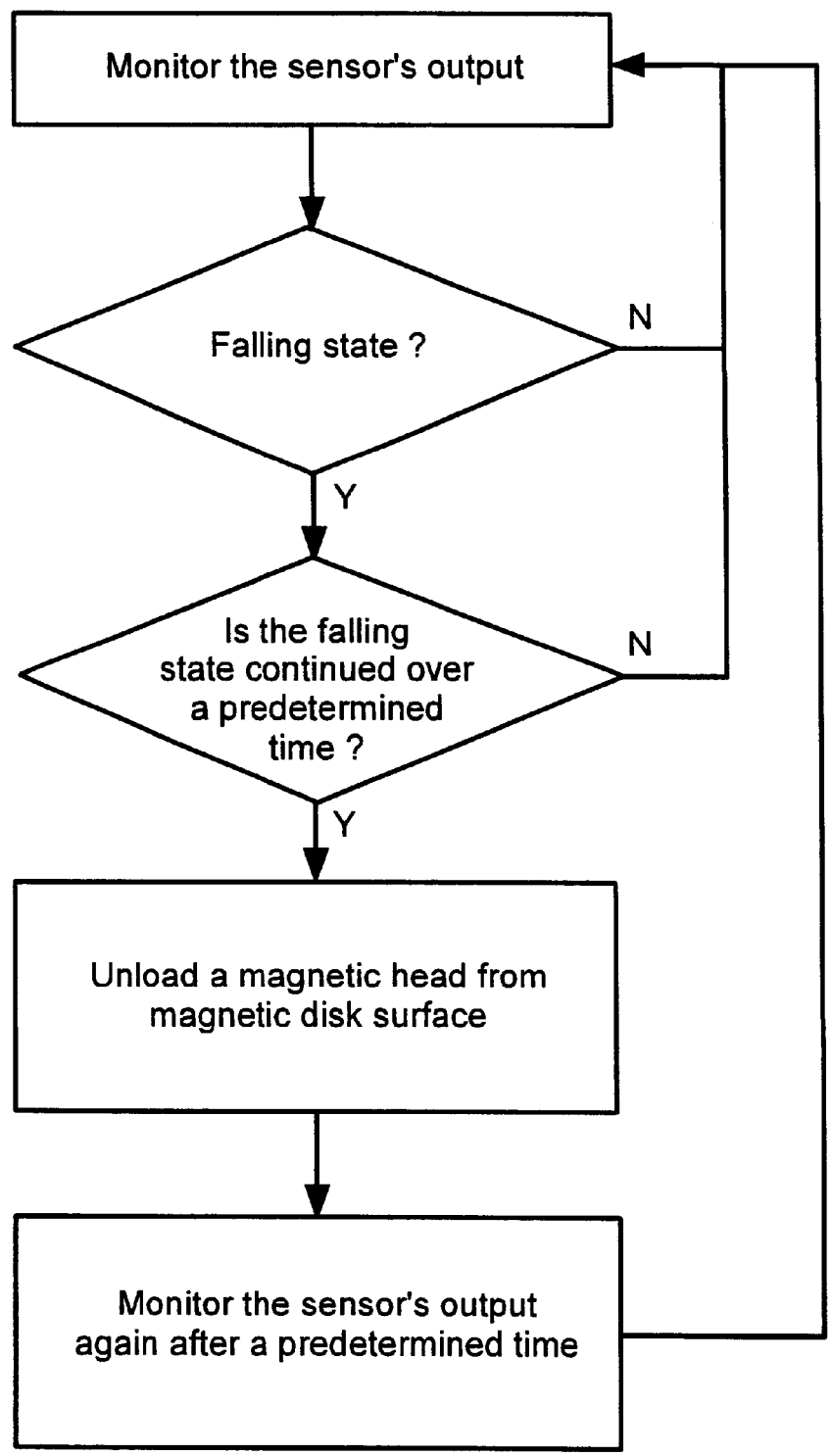
FIG. 7 is a flow chart illustrating an algorithm of detecting falling state.
Figure 8:
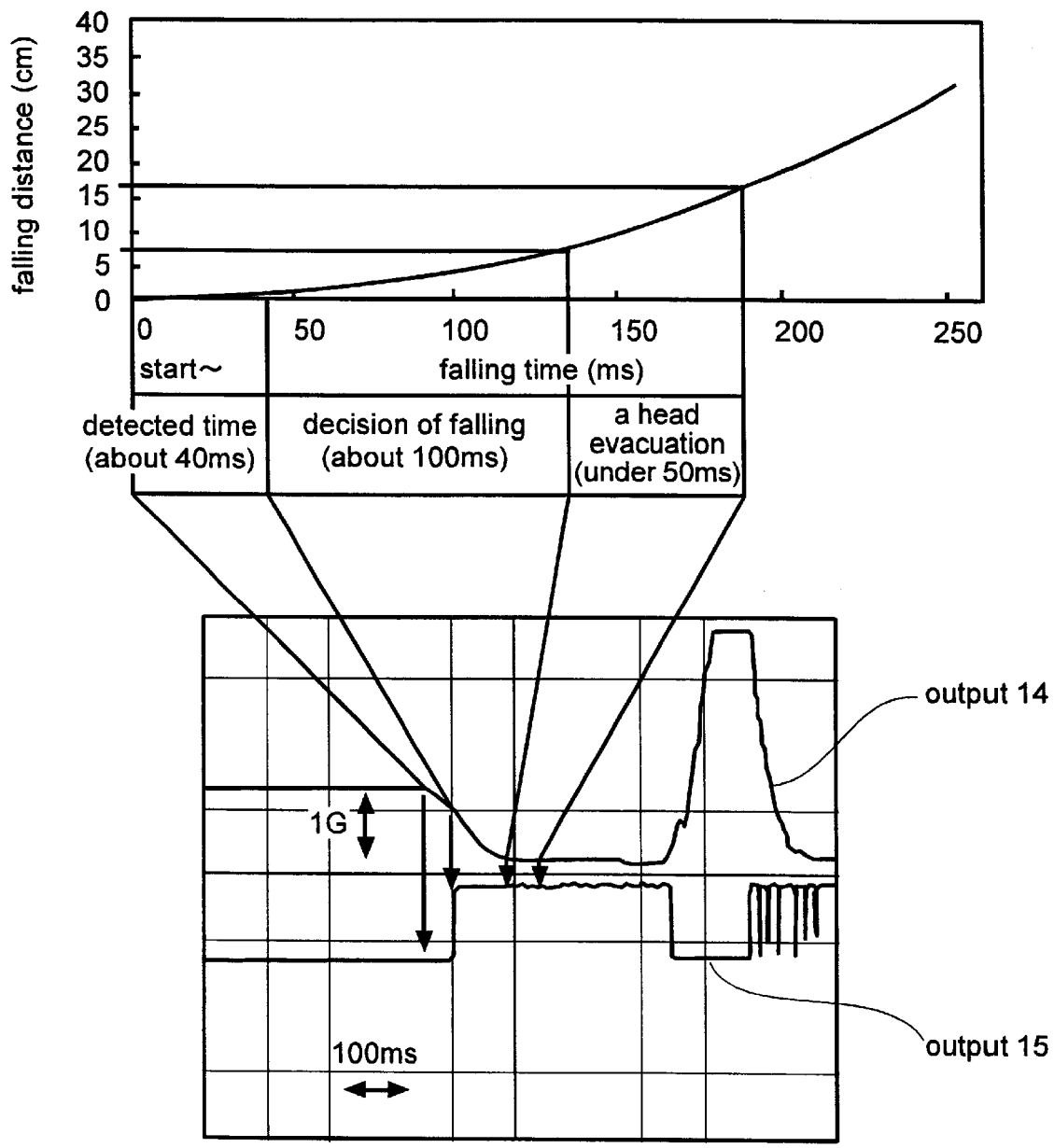
FIG. 8 is a drawing illustrating the relation between a first example of the output of the falling sensor and the movement of the sensor during free falling.
Figure 9:
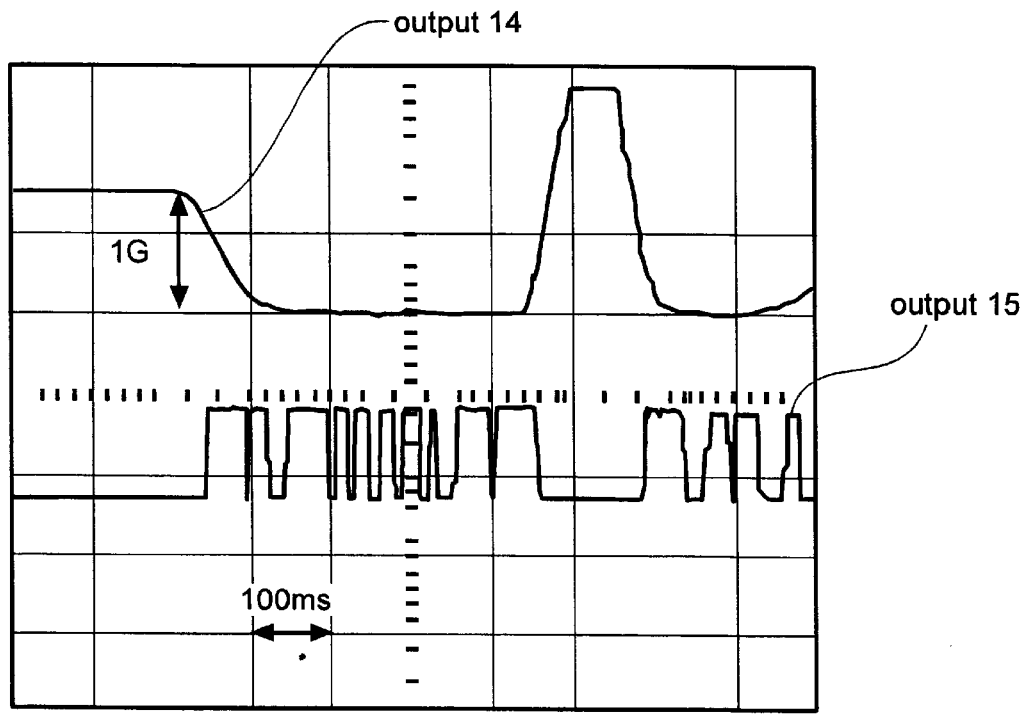
FIG. 9 is a drawing illustrating a second example of the output of the falling sensor during a free falling.
Figure 10:
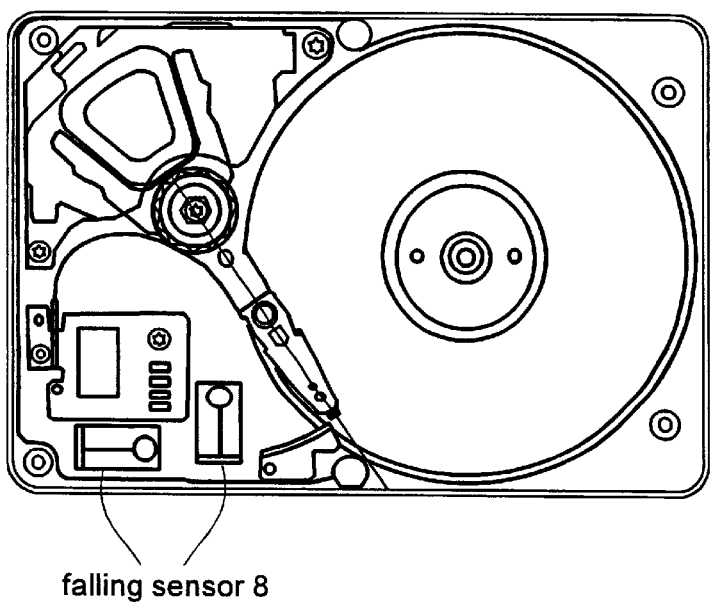
FIG. 10 is a drawing illustrating an example of the outline of the magnetic disk drive of another preferred embodiment of the present invention.

The preferred embodiments of the present invention are described referring to FIG. 1 to FIG. 10. FIG. 1 is a drawing showing the outline of the magnetic disk drive of the preferred embodiment of the present invention. FIG. 2 to FIG. 5 are the drawings illustrating the examples of the structures of the falling sensors 8. FIG. 6 is a graph showing the relation between the falling time and the falling distance and FIG. 7 is a flowchart showing the algorithm of detecting falling state. FIG. 8 and FIG. 9 are the examples of the output of the sensors. FIG. 10 is a drawing showing the outline of the magnetic disk drive of another preferred embodiment of the present invention.

As shown in FIG. 1, the magnetic disk drive to which present invention is applied, is provided with at least one magnetic disk 1 for recording data, a motor to rotate the magnetic disk 1, a base 2 to fix the motor on itself, a magnetic head 3 which reads data from or which writes data to the magnetic disk 1, a carriage 4 supporting the magnetic head 3, a coil 5 attached to the carriage 4 for transferring the magnetic head 3 to any positions on the magnetic disk 1, a voice coil motor 6 forming a magnetic circuit to put the coil 5 between the pole pieces of the magnetic circuit, a ramp 7 for evacuating the magnetic head 3 to the outside of the magnetic disk 1, and a falling sensor 8 attached to the base 2.

Figure 2:
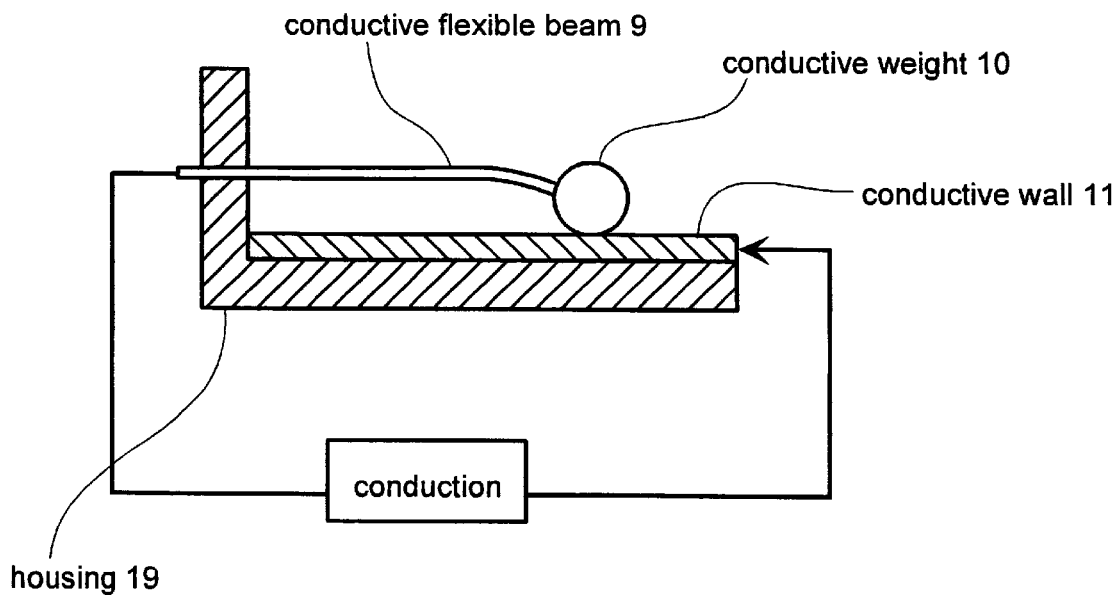
FIG. 2 is a drawing illustrating a first example of a structure of a falling sensor using a flexible beam.

A falling sensor of the present invention attached to the magnetic disk drive has a structure as illustrated in FIG. 2, which comprises, a conductive weight 10 is attached to the edge of a conductive flexible beam 9, the flexible beam 9 is bent by the conductive weight 10, the weight 10 contacts a conductive wall 11, and a contacted point gives a conduct between the weight 10 and the wall 11. A component 19 is a housing.

When the magnetic disk drive, wherein the conductive weight 10 and the conductive wall 11 are in contact state, falls in the vertical direction of the wall 11, the deflection of the flexible beam 9 by the weight of the weight 10 disappears by zero gravity state, and the weight 10 moves apart from the wall 11. The falling is detected by the interruption of the conduction between the weight 10 and the wall 11. The weight 10 can be placed at other positions than the edge of the conductive flexible beam 9.

Figure 3:
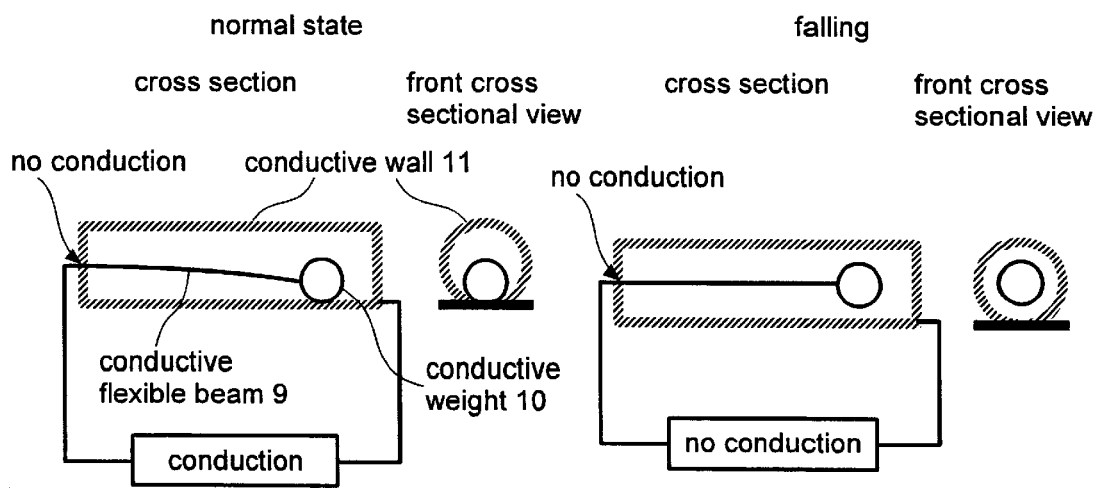
FIG. 3 is a drawing illustrating a second example of the structure of the falling sensor using the flexible beam.

FIG. 3 shows a second configuration of the falling sensor in preferred embodiment of the present invention. This falling sensor is provided with a conductive flexible beam 9 of the cylindrical shape and a conductive wall 11 of a tubular shape. At the center of the cross section of the conductive wall 11, a conductive flexible beam 9 is fixed and electrically-isolated with the conductive wall 11. Adopted such a shape, the sensor can keep better conductivity and its stability, which results in less change of contact pressure at the contact point while the magnetic disk drive set with the sensor is held on a slightly-inclined plane from a standard plane, for example, while the magnetic disk drive is held on a slightly-inclined plane from a horizontal plane. Compared to the sensors having the shapes of the rectangular cross sections of the flexible beam or the flat walls, the falling sensor of that structure has better stability in contact pressure and keeps conductivity in more stable. Therefore, the flexible beam 9 can be realized by not only a cylinder but also by one or more members of springs, rectangular columns, or plates which can be replaceable. The position of the weight is not limited to the edge of the beam.

FIG. 4 shows a third configuration of preferred embodiment of the present invention. The conductive flexible beam 9 is arranged to the center of the cross section of the conductive wall 11 being insulated from the conductive wall 11. This falling sensor holds the weight 10 at the middle portion of the flexible beam 9, and both ends of the conductive flexible beam 9 are fixed with insulation to the conductive wall 11. In this case, the falling sensor can be also realized with the holding flexible beam of not only a cylinder but also one or more members of springs, rectangular columns, or plates which can replace the cylinder.

FIG. 5 shows a fourth configuration of preferred embodiment of the present invention. This falling sensor uses a ferromagnetic material for a conductive wall 13 (a conductive ferromagnetic wall 13) and a magnet for a weight 12 (a conductive magnet weight 12). Herewith a stability of contact in normal state can be held higher and a strength of a holding part of the weight can be increased. This relative relation can be reversed by forming the conductive wall 13 with a magnet. The position of the weight and the method of holding the weight are similar to those of the configurations described above.

FIG. 6 shows the relations between the falling distance and the falling time at the free falling. For example, it takes about 200 ms in the falling time for the falling from the height of 20 cm.

FIG. 7 shows the relations between the output of the falling sensor and the movement of the magnetic disk drive. In case the output of the falling sensor indicates the falling state when the acceleration that has a threshold level determined by the difference between a force acted on the weight which tries to recover the bend of the flexible beam 9, and the gravity acted on the weight 12, makes the weight 12 isolate from the wall 13, in other words, when the falling sensor detects the falling state, the magnetic disk drive or the system confirms whether the falling state is continued for a predetermined time period in order to avoid an erroneous operation that considers low frequency vibration for a falling. If the output indicating the falling state is continue, the magnetic head is evacuated from the surface of the magnetic disk medium. Then, the evacuation continues for a while to wait residual vibrations after getting shock are settled, and then the falling sensor restarts the monitoring. For example, if it takes 50 ms for the sensor to generate the response of the falling state with the state exceeding a certain acceleration level, 100 ms for the decision of the continuance of the falling state and 50 ms for the evacuation of the magnetic head from the surface of the magnetic disk, the total of those will be 200 ms. The damage on the magnetic disk media can be avoided if it falls from the 20 cm height or more.

FIG. 8 is a first example showing an output of free falling of the falling sensor. The detail is: an output 14 is obtained from a general-purpose acceleration sensor, which shows the falling state; an output 15 is obtained from the falling sensor of present invention. The falling height is 70 cm. After a start of the falling, when 40 ms has passed, the acceleration level decreases under a certain value and a pulse wave form corresponding to the turn ON (or OFF depending on sensors those adopt other logical structures) of the falling sensor is generated. The output is the waveform, which will be turned OFF (or ON) after reaching a certain value. Because such a clean noiseless pulse waveform can be output from the sensor, no special correction to the output is required and the configuration of its control circuit become simple. This figure together with the graph of the falling time, will show that the evacuation of the magnetic head can be completed at the falling height of 17 cm assigning 100 ms for decision time and 50 ms for evacuation time.

The acceleration level on which the falling sensor can detect the falling, is decided by the force exerted to the weight by the deflection of flexible beam 9 and the gravity exerted to the weight 10. In case, shown in FIG. 2, the deflected flexible beam 9 gives the weight 10 force back of 0.6G×(mass of weight), if the acceleration applied to the weight, which is caused by the falling, becomes 0.7 G or more, the deflected flexible beam 9's force overcomes the acceleration force exerted to the weight 10 and the weight 10 moves apart from the wall 11. The smaller the force exerted to the weight by the deflection of the flexible beam 9 becomes, the longer the time from the start of the falling to the detection of the falling by the sensor become, and the larger it becomes, the more sensitive the sensor becomes resulting in being a vulnerable to the erroneous operation by vibrations or shocks. Therefore, the range of the force exerted to the weight by the deflection of the flexible beam 9 stands realistically from (0.4 G)×(mass of weight) to (0.9 G)×(mass of weight). The falling sensor detects the state of falling by detecting the continuance of the state of detachment between the weight 10 and the wall 11.

FIG. 9 shows an example of an output of the sensor with noise. As such noise often becomes a cause of error operation in the detection of the falling state, it is necessary for a signal processing circuit to filter the noise out. Therefore, it is required for the sensor to keep the stable contact state.

FIG. 10 shows the magnetic disk drive of another preferred embodiment of the present invention. By using a pair of the falling sensors of the structure shown in FIG. 3 to FIG. 5 (the sensor shown in FIG. 2 can also be applicable) and by attaching the pair to the magnetic disk drive so that the direction of the flexible beams cross at right angles each other on a same plane, the sensors can operate stably wherever direction the magnetic disk drive inclines. (For example, the stable contact can be maintained when the magnetic disk drive inclines around the axis of the beam of the falling sensor. But if the axis of the inclination is not the same with the axis of the beam, the stability of the contact may be reduced. However, setting each beam in two sensors crossed at right angles each other on a plane including the beams, either of the falling sensors can respond to the inclination in any directions with stable contact.)

With the magnetic disk drive of another preferred embodiment of the present invention shown by FIG. 10, either of the falling sensors in this structure will be able to detect the falling wherever direction the magnetic disk drive falls.

The magnetic disk drive of the present invention can set in the information processing device. In this case, besides setting the magnetic disk drive with the falling sensor of the present invention, in the information processing device, it is possible to arrange the falling sensors in the information processing device and to evacuate the magnetic head of the magnetic disk drive from the surface of the magnetic disk medium when the falling sensor detect the falling.

Figure 11:
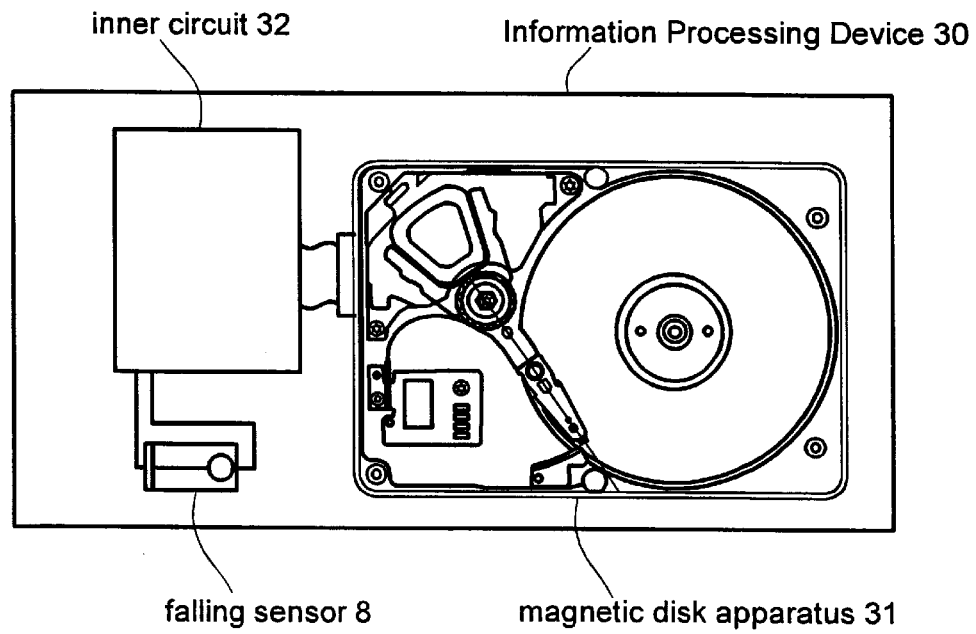
FIG. 11 is a drawing illustrating the outline of the information processing device built in with the falling sensor and the magnetic disk drive of the present invention.
Figure 12:
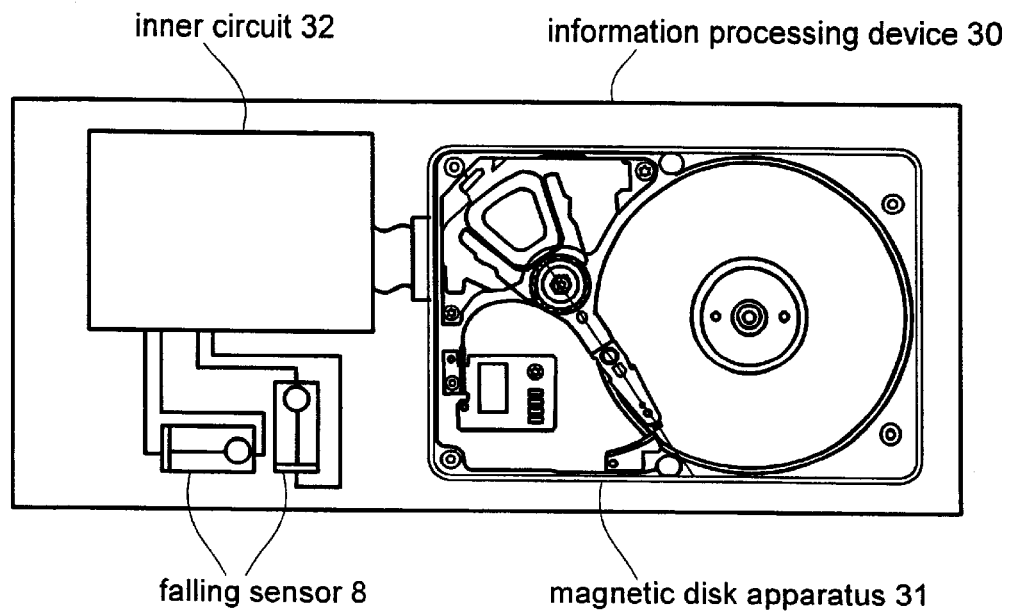
FIG. 12 is a drawing illustrating an outline of the information processing device built in with the falling sensor and the magnetic disk drive of another preferred embodiment of the present invention.

FIG. 11 and FIG. 12 show the information processing device of the preferred embodiment of the present invention, which is built in with the falling sensors of the present invention and the magnetic disk drive.

In FIG. 11, a magnetic disk drive 31 and a falling sensor 8 are connected to an inner circuit 32 of an information processing device 30. The inner circuit 32 is provided with functions which are objects of the information processing device 30, general control functions of the magnetic disk drive and a control function similar to the function shown in the flow chart of FIG. 7. The inner circuit 32 monitors an output of the sensor, and when it detects the falling state, it decides whether the falling state continues more than a predetermined period and if the falling state continues more than the predetermined period, it evacuates the magnetic head from a surface of the magnetic disk medium.

An information processing device shown in FIG. 12 has similar structure to the magnetic disk drive of the preferred embodiment of the present invention shown by FIG. 10, except mounting a pair of the falling sensors 8 outside the magnetic disk drive. Directions of the flexible beams cross at right angles each other on a same plane and the sensors can maintain a stable contact wherever direction the information processing device inclines. Either of the falling sensors in this structure can detect the falling wherever direction the information processing device falls.

In the preferred embodiment shown in FIG. 11 and FIG. 12, the inner circuit 32 has the function of monitoring the output of the falling sensors 8 shown by the flow chart of FIG. 7, however, the function under the flowchart shown in FIG. 7 can also be processed in the magnetic disk drive by connecting the output of the falling sensors 8 to the magnetic disk drive.

As above described, the preferred embodiment of the present invention Includes the following configurations and functions.

(1) A conductive weight is attached to a conductive flexible beam or a beam member having the similar function of the conductive flexible beam. The weight touches a conductive wall because the beam is deflected with the weight by the gravity.

A touched portion between the weight and the wall, namely, a contacting point, has a conductive structure. While the touched portion keeps conductive, if the structure falls, no-gravity state occurs which generates inertia force to separate the weight and the wall with a force of a deflected flexible beam. Sensing the separation by way of monitoring the conductivity is used with the above structure in a falling sensor. When a magnetic disk drive with this sensor falls, the conductive weight attached to the conductive beam goes into no-gravity state, which cancels the weight deflecting the beam in other words. A recovering force of the flexible beam weakens the deflection of the beam, which makes the weight apart from the conductive wall. The falling (falling state) can be detected by a disappearance of the conductivity.

(2) A falling sensor having a structure, wherein a conductive weight is held by a pair of flexible beams, the weight contacts the conductive wall by the deflection of the beams by the gravity adding its influence to the weight. A contact portion between the weight and the wall has a conductive structure. While the contact portion keeps conductive, if the structure falls, no-gravity state occurs which generates inertia force to separate the weight and the wall with a force of a deflected flexible beam. Sensing the separation by way of monitoring the conductivity is used with the above structure in a falling sensor.

(3) The above structure of the falling sensor, wherein one of the conductive flexible beam and the conductive weight held by the beam uses a magnet and the other of them uses ferromagnetic material, or vice versa. The conductive weight touches the conductive wall by the gravity and magnetic force. A touched portion between the weight and the wall has a conductive structure. While the touched portion keeps conductive, if the structure falls, no-gravity state occurs which generates inertia force to separate the weight and the wall with a force of a deflected flexible beam. Sensing the separation by way of monitoring the conductivity is used with the above structure in a falling sensor.

When the above sensors detects the falling state, the recording/reproducing operation of data is interrupted and a evacuating operation, in which a magnetic head is evacuated from a surface of a magnetic disk, is enabled. Therefore, demolitions of the magnetic head and the magnetic disk by a crush between the magnetic head and the magnetic disk, which is caused by a shock at the end of falling, can be avoided. The shock resistance of the magnetic disk drive can be improved.

By setting a pair of sensors in the directions crossed at right angles each other on a same plane, the falling state in any directions can be detected.

In the present invention, the sensors similar to those of the above examples can be mounted on the information processing device itself in which a magnetic disk drive is installed. In this case, the falling sensor is not needed in the magnetic disk drive. When the falling sensor mounted on the information processing device detects the falling state, the magnetic head is evacuated from the surface of the magnetic disk. The information processing device, which does not have a magnetic disk drive, can be mounted with the falling sensors of the present invention, if the information processing device require to detect the falling.

According to the present invention, the falling sensor with simple structure can detect the falling and if it detects the falling, it can have a magnetic head evacuated from a surface of a magnetic disk. Therefore, a demolition of the magnetic head and the magnetic disk by the crush between them caused by the shock at the end of the falling can be avoided.

Having described a preferred embodiment of the invention with reference to the accompanying drawings, it is to be understood that the invention Is not limited to the embodiments and that various changes and modifications could be effected therein by one skilled in the art without departing from the spirit or scope of the invention as defined in the appended claims.

What is claimed is:

1. A magnetic disk drive comprising:
   a magnetic disk which records or reproduces information;
   a motor which rotates said magnetic disk; a base which fixes said motor;
   a magnetic head which reads from or writes to said magnetic disk;
   a carriage which supports said magnetic head;
   a coil which is mounted on said carriage for transferring said magnetic head to any position on the surface of said magnetic disk;
   a voice coil motor comprising a magnetic circuit and said coil;
   an unload mechanism which evacuates said magnetic head from the surface of said magnetic disk; and
   a falling sensor provided with a conductive weight,
   a flexible elastic member which is deformed by the gravity of said weight, and
   a conductive member which is arranged to be placed in contact or non-contact with said weight;
   wherein said weight contacts said conductive member at the deflected state of said elastic member, and said weight becomes to be in non-contact with said conductive member when said magnetic disk drive is falling, so that said magnetic head is evacuated by said unload mechanism.

2. A magnetic disk drive comprising:
   a magnetic disk which records or reproduces information;
   a motor which rotates said magnetic disk;
   a base which fixes said motor;
   a magnetic head which reads from and writes to said magnetic disk;
   a carriage which supports said magnetic head;
   a coil which is mounted on said carriage for transferring said magnetic head to any position on the surface of said magnetic disk;
   a voice coil motor making a magnetic circuit with said coil;
   an unload mechanism which evacuates said magnetic head from the surface of said magnetic disk; and
   a falling sensor provided with a tubular conductive member,
   an elastic member which is a flexible beam arranged inside said tubular conductive member, and
   a weight which is arranged to an edge of said beam, deforming said beam, and contacting said conductive member at the deflected state of said elastic member;
   wherein said weight comes out of contact with said conductive member during a falling of said magnetic disk drive, so that said magnetic head is evacuated by said unload mechanism.

3. A magnetic disk comprising:
a motor which rotates a magnetic disk recorded or reproduced with information;
a base which fixes said motor;
a magnetic head which reads from or writes to said magnetic disk;
a carriage which supports said magnetic head;
a coil mounted on said carriage for transferring said magnetic head to the recording and reproducing positions on said magnetic disk;
a voice coil motor making a magnetic circuit with said coil;
an unload mechanism which evacuates said magnetic head from the recording and reproducing positions on said magnetic disk; and
a falling sensor which is provided with a conductive weight,
a flexible elastic member which is deformed by said weight, and
a conductive member which is arranged to be placed in contact or non-contact with said weight;
wherein said weight contacts said conductive member at the deflected state of said elastic member by said weight, and said weight becomes to be in non-contact with said conductive member when said magnetic disk drive is falling, so that said magnetic head is evacuated by said head unload mechanism.

4. A magnetic disk drive comprising:
a motor which rotates a magnetic disk recording and reproducing information;
a base which fixes said motor;
a magnetic head which read from or write to said magnetic disk;
a carriage which supports said magnetic head;
a coil which is mounted on said carriage for transferring said magnetic head to recording and reproducing positions on said magnetic disk;
a voice coil motor making a magnetic circuit with said coil;
an unload mechanism which evacuates said magnetic disk from recording and reproducing positions on said magnetic disk; and
a falling sensor which is provided with a tubular conductive member,
an elastic member which is a flexible beam arranged inside said tubular conductive member, and
a weight which is attached to an end of said beam, deforming said beam and contacting said conductive member at the deflected state of said elastic member;
wherein said weight come out of contact with said conductive member when said magnetic disk drive is falling and said magnetic head is evacuated by said unload mechanism.

5. The magnetic disk drive according to claim 1, wherein either of said conductive member or said weight of said falling sensor uses a magnetic material and the other of those uses a ferromagnetic material.

6. The magnetic disk drive according to claim 1, wherein another falling sensor is mounted inside said magnetic disk drive so that directions of each elastic member of falling sensors cross at right angles each other on a same plane.

7. An information processing device comprising the magnetic disk drive according to claim 1, wherein falling of the information processing device is detected by said falling sensor and said magnetic head is evacuated by said unload mechanism.

8. An information processing device comprising:
a magnetic disk which records or reproduce information;
a magnetic head which reads from or writes to said magnetic disk;
an unload mechanism which evacuates said magnetic head from the surface of said magnetic disk; and a falling sensor, said falling sensor including:
a conductive weight,
a flexible elastic member deformed by said weight, and
a conductive member which is arranged to be placed in contact or non-contact with said weight,
wherein said weight contacts said conductive member at the deflected state of said elastic member by said weight;
wherein said weight becomes to be in non-contact with said conductive member when said information processing device is falling, so that said magnetic head is evacuated by said unload mechanism.

9. An information processing device comprising:
a magnetic disk which records or reproduce information;
a magnetic head which reads from or writes to said magnetic disk;
an unload mechanism which evacuates said magnetic head from the surface of said magnetic disk; and a falling sensor, said falling sensor including
a tubular conductive member,
an elastic member which is a flexible beam arranged inside said tubular conductive member, and
a weight which is attached to an end of said beam, deforming said beam and contacting said conductive member in the deflected state of said beam;
wherein said weight comes out of contact with said conductive member when said information processing device is falling, and said magnetic head is evacuated by said unload mechanism.

10. An information processing device including:
a magnetic disk drive comprising:
a motor which rotates an information recording or reproducing magnetic disk,
a magnetic head which reads from or writes to said magnetic disk, and
an unload mechanism which evacuates said magnetic head from recording and reproducing positions on said magnetic disk; and
a falling sensor comprising a conductive weight,
a flexible elastic body which is deformed by said weight, and
a conductive member which is arranged to be placed in contact or non-contact with said weight;
wherein said weight contacts said conductive member at the deflected state of said elastic body by said weight, and said weight becomes to be in non-contact with said conductive member when said information processing device is falling, so that said magnetic head is evacuated by said unload mechanism.

11. An information processing device including:
a magnetic disk drive comprising:
a motor which rotates an information recording or reproducing magnetic disk,
a magnetic head which reads from or writes to a magnetic disk, an unload mechanism which evacuates said magnetic head from recording and reproducing positions on said magnetic disk; and a falling sensor comprising a tubular conductive member, an elastic member which is a flexible beam arranged inside said tubular conductive member, and a weight which is arranged to an end of said beam, deforming said beam and contacting said conductive member at the deformed state of said elastic member;

wherein said weight comes out of contact with said conductive member during a falling of said information processing device, so that said magnetic head is evacuated by said unload mechanism.

12. The information processing device according to claim 8, wherein either of said conductive member or said weight of said falling sensor uses a magnet and the other of those uses a ferromagnetic material.

13. The information processing device according to claim 8, wherein another falling sensor is arranged so that directions of each elastic member of falling sensors cross at right angles each other on a same plane.

14. A falling sensor comprising:

a conductive weight;

a flexible elastic member deformed by said weight; and a conductive member arranged to be placed in contact or non-contact with said weight; wherein said weight contacts said conductive member at the deflected state of said elastic member by said weight, and said weight becomes to be in non-contact with said conductive member when said falling sensor is falling.

15. A falling sensor comprising:

a tubular conductive member;

an elastic member which is a flexible beam arranged inside said tubular conductive member; and a weight which is attached to an end of a beam, deforming said beam and contacting said conductive member at the deflected state of said elastic member, wherein said weight comes out of contact with said conductive member when said falling sensor is falling.

16. The falling sensor according to claim 14, wherein either said conductive member or said weight of said falling sensors uses a magnet and the other of said conductive member and said weight uses a ferromagnetic material.

17. A control method of a magnetic disk drive, said magnetic disk drive having:

an information recording or reproducing magnetic disk, a magnetic head which read from or write to said magnetic disk, an unload mechanism which evacuates said magnetic head from the surface of said magnetic disk, and a falling sensor which is provided with a conductive weight, a flexible elastic member deformed by said weight, and a conductive member which is arranged to be placed in contact or non-contact with said weight, wherein said weight contacts said conductive member at the deflected state of said elastic member by said weight, said control method comprising the steps of:

monitoring whether an output of said falling sensor shows a falling state, in which said weight is caused to be in non-contact with said conductive member;

keeping said monitoring state for a predetermined time period if said output shows said falling state; and evacuating said magnetic head from the surface of said magnetic disk after said predetermined time period.

18. A control method of an information processing device, said information processing device including a magnetic disk drive comprising:

an information recording or reproducing magnetic disk, a magnetic head which read from or write to said magnetic disk, and an unload mechanism which evacuates said magnetic head from the surface of said magnetic disk, and a falling sensor comprising a conductive weight, a flexible elastic member deformed by said weight, and a conductive member which is arranged to be placed in contact or non-contact with said weight, wherein said weight contacts said conductive member at the deflected state of said elastic member, said control method comprising the steps of:

monitoring whether an output of said falling sensor shows a falling state, in which said weight becomes to be in non-contact with said conductive member;

keeping said monitoring state for a predetermined time period if said output shows said falling state; and evacuating said magnetic head from the surface of said magnetic disk after said predetermined time period.

19. A control method of an information processing device, said information processing device including:

a falling sensor comprising a conductive weight, a flexible elastic member deformed by said weight, and a conductive member which is arranged to be placed in contact or non-contact with said weight, wherein said weight contacts said conductive member at the deflected state of said elastic member, and a shock-resistant means for performing a shock-resistant operation, comprising the steps of:

monitoring whether an output of said falling sensor shows a falling state, in which said weight becomes to be in non-contact with said conductive member;

keeping said monitoring state for a predetermined time period if said output shows said falling state; and evacuating said magnetic head from the surface of said magnetic disk after said predetermined time period.

20. The falling sensor according to claim 15, wherein either said conductive member or said weight of said falling sensors uses a magnet and the other of those uses a ferromagnetic material.

* * * * *